Sept. 3, 1946.  D. M. McBEAN  2,406,886
COFFEE BIN
Original Filed March 19, 1940   3 Sheets-Sheet 1
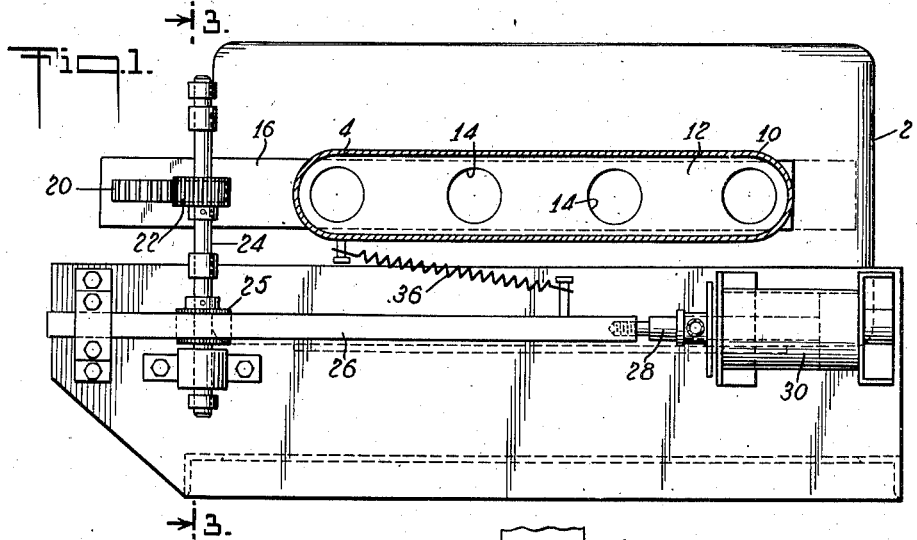
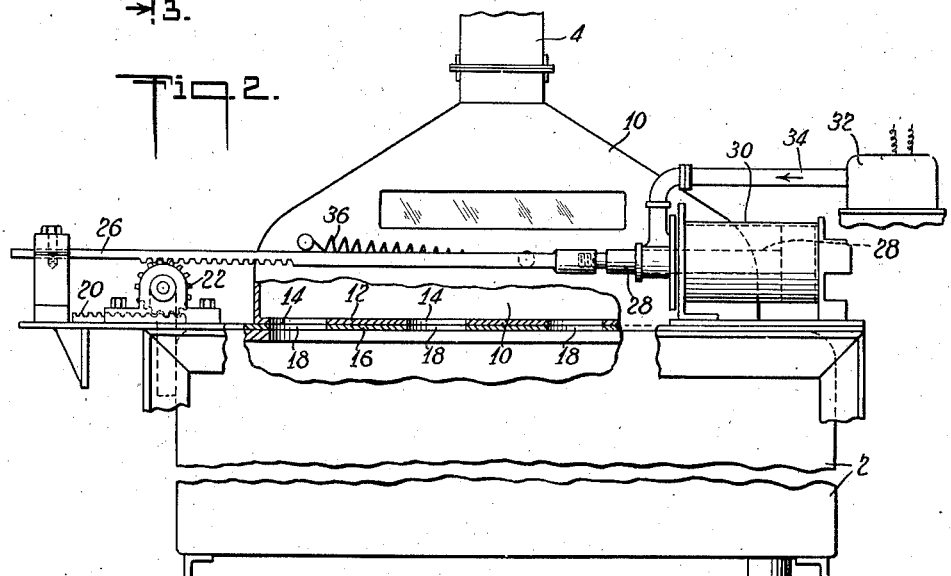
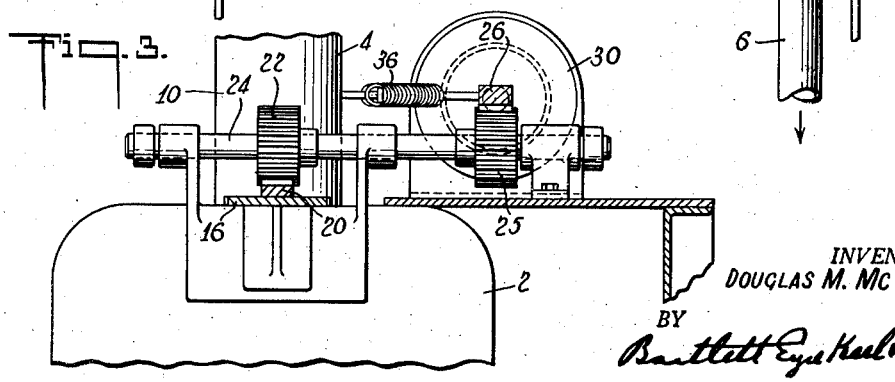
INVENTOR.
DOUGLAS M. McBEAN
BY
ATTORNEYS Sept. 3, 1946.  D. M. McBEAN  2,406,886
COFFEE BIN
Original Filed March 19, 1940   3 Sheets-Sheet 2
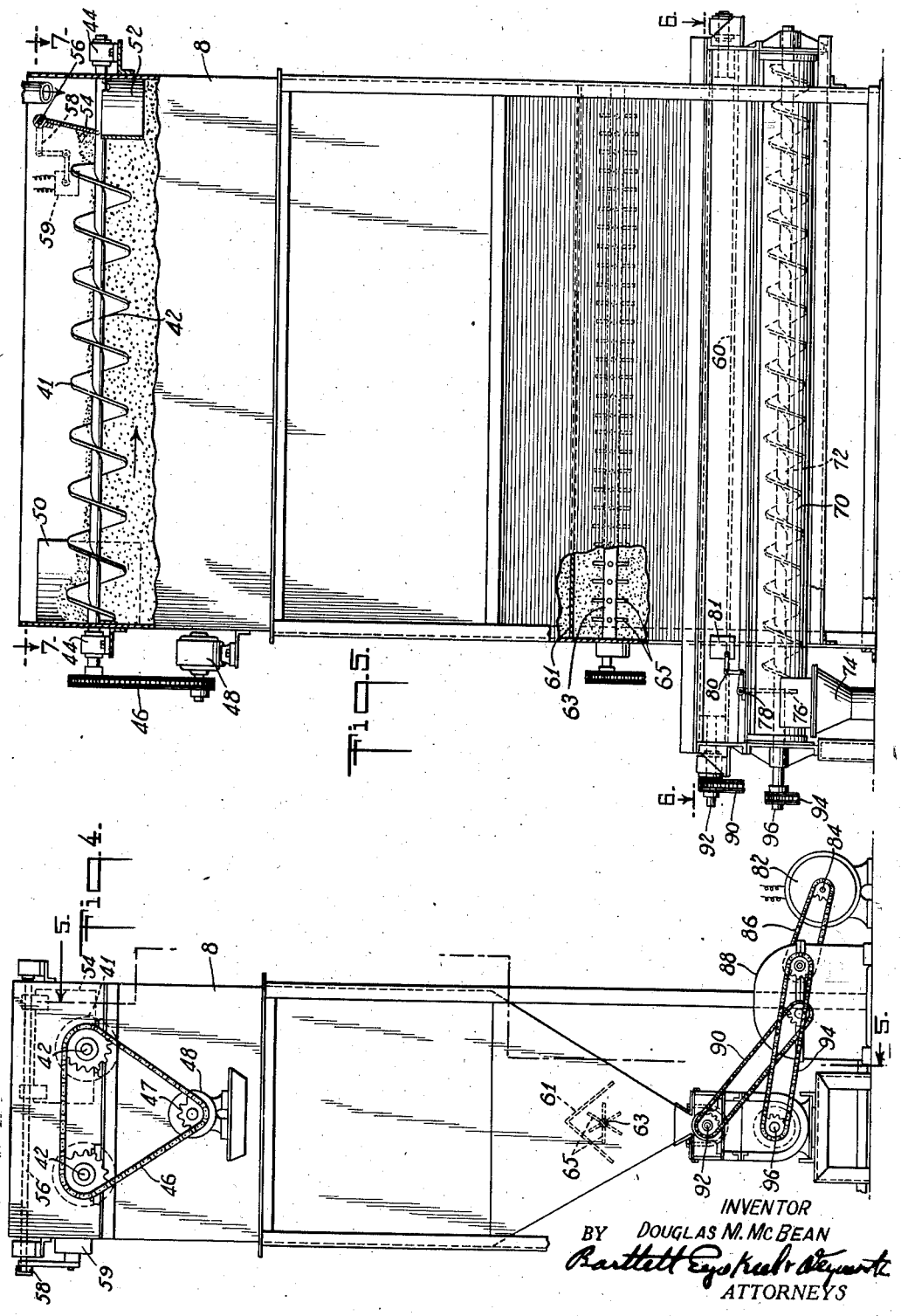
INVENTOR
DOUGLAS M. McBEAN
BY Bartlett
ATTORNEYS

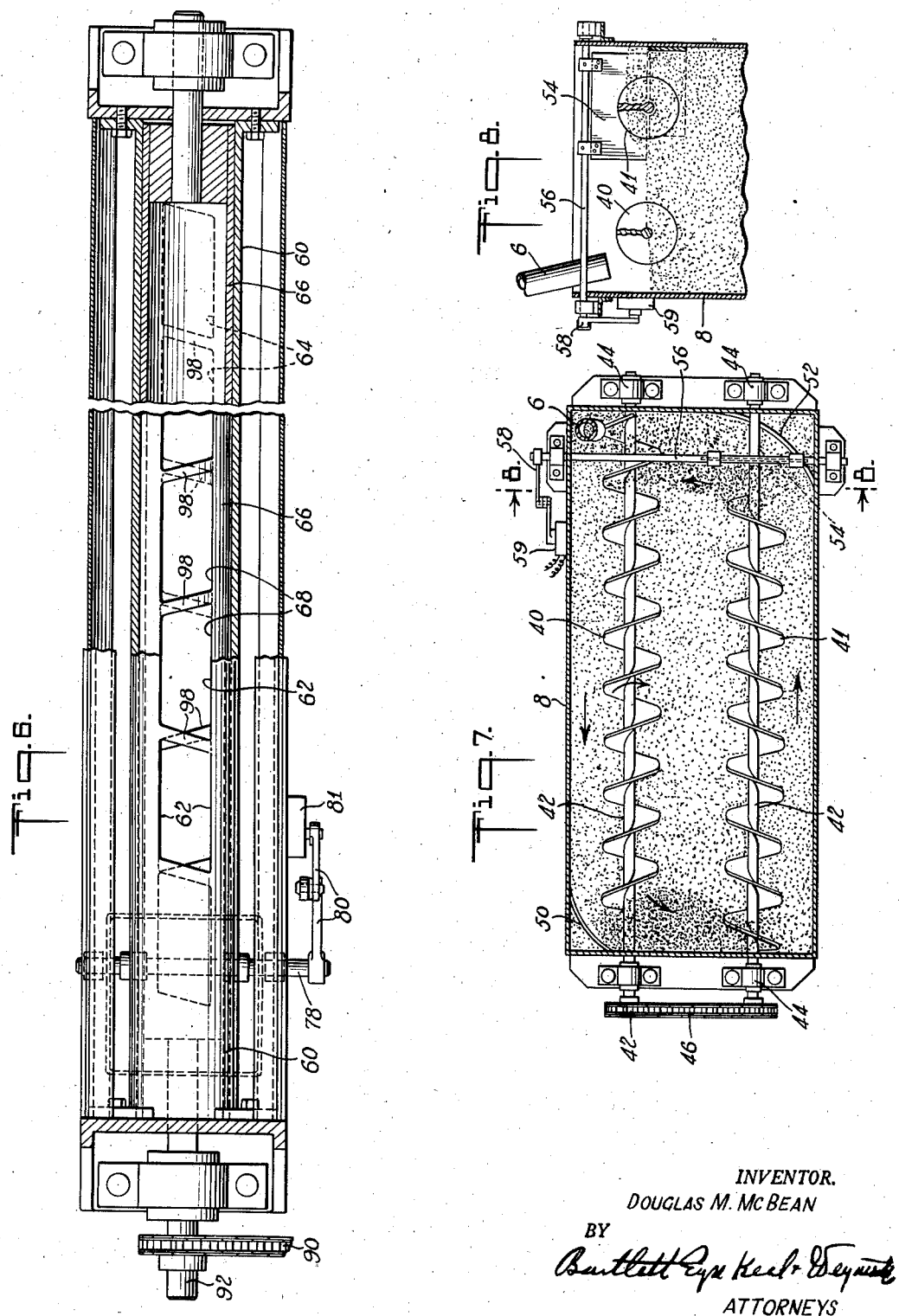

Patented Sept. 3, 1946

2,406,886

UNITED STATES PATENT OFFICE 2,406,886

COFFEE BIN

Douglas M. McBean, Rochester, N. Y., assignor to Beech-Nut Packing Company, Canajoharie, N. Y., a corporation of New York Original application March 19, 1940, Serial No. 324,843, now Patent No. 2,321,838, dated June 15, 1943. Divided and this application December 9, 1942, Serial No. 468,379

1 Claim. (Cl. 214—17)

The present invention relates to an apparatus for handling finely divided material, and has special reference to an apparatus for use in processing coffee.

In the processing of steel cut coffee, or other coffee which is ground relatively coarse or coarser than the conventional drip grind coffee, it is necessary to store it after grinding from 45 to 60 minutes before packing and sealing it in vacuum cans. The reason for this is that the small cubes or particles of coffee contain innumerable gas cells which are under considerable pressure, and it takes approximately that length of time for this gas to escape from the cells in sufficient quantity so that when the coffee is placed in a can and sealed under vacuum, enough gas will not then come out of the coffee to build up an objectionable pressure in the can.

One of the objects of the present invention is to provide an apparatus which is capable of feeding ground coffee from the coffee mill or grinder to the vacuum can-filling machine in such a manner that the required quantity of gas is permitted to escape from the particles of coffee uniformly.

Another of the objects of the invention is to provide a novel and improved apparatus for handling ground coffee and other finely divided material.

The several features of the invention, whereby the above-mentioned and other objects may be attained, will be readily understood from the following description and accompanying drawings, in which:

Figure 1 is a sectional plan view of the upper portion of the apparatus in its preferred form, in which portion the coffee beans are supplied to the apparatus and ground;

Fig. 2 is a side view of said upper portion of the apparatus with parts broken away to save space;

Fig. 3 is a sectional elevation on an enlarged scale taken substantially on the line 3—3 of Fig. 1;

Fig. 4 is an end elevation of the storage bin portion of the apparatus which receives the ground coffee from the grinder;

Fig. 5 is a side view of the same with certain parts broken away;

Fig. 6 is a sectional plan view, taken on the line 6—6 of Fig. 5;

Fig. 7 is a sectional plan view taken on the line 7—7 of Fig. 5; and

Fig. 8 is a detail sectional view, taken on the line 8—8 of Fig. 7.

The present application is a division of my Patent 2,321,838, dated June 15, 1943.

The apparatus may comprise a coffee mill or grinder (not shown) arranged in a casing 2, a chute or conduit 4 through which the coffee beans are supplied to the coffee mill, and a pipe 6 through which the coffee when ground is discharged from the coffee mill and casing 2.

The ground coffee discharges from the pipe 6 into a bin 8 from which it is delivered in measured quantities, as hereinafter described, to the can-filling machine.

The conduit 4 for supplying the coffee beans to the mill has the opposite sides of its lower portion inclined downwardly and outwardly so as to form a rectangular portion 10 that opens into the upper end of the grinder casing 2. Extending across the lower end of the portion 10 is a wall 12 which is provided with a series of apertures 14. A shutter or damper plate 16 is mounted to slide longitudinally in engagement with the under side of the wall 12 and is provided with a series of openings 18 which when the plate 16 is in one position register with the openings 14 and thus permit the coffee beans to flow from the conduit 4 into the grinder. By moving the damper inwardly the openings 14 may be wholly or partly closed to shut off the flow of the beans.

The damper 16 is thus adapted to be moved to open and close the openings 14 varying degrees by means of a rack 20 on the outer end portion of the damper which is engaged by a pinion 22 secured on a shaft 24. The pinion 22 and shaft 24 is operated by means of a pinion 25 on the shaft 24 which is engaged by a rack 26 secured on the end of a piston rod 28 of a cylinder 30. The piston rod 28 is adapted to be moved outwardly in the direction to open the openings 14 by means of an electric motor driven air compressor 32 which directs air through a pipe 34 into the cylinder back of the piston.

The piston rod 28 and rack-rod 26 are adapted to be moved in the opposite direction to effect closing of the openings 14, by means of a coil spring 36 connected with the rod 26.

With this construction, upon admitting compressed air to the cylinder 30, the damper 16 is moved to close the openings 14 and when the air is released from the cylinder, the spring 36 acts through the rack-rod 26 to move the damper 16 to close the openings 14.

The coffee bin 8 (Figs. 4 and 5) is rectangular and is relatively narrow in cross-section as shown, and has its upper end open. The lower portions of the side walls of the bin are inclined downwardly and inwardly with their lower ends spaced apart to provide a long and narrow opening (Figs. 4 and 5) in the bottom of the bin.

Near the top of the bin 8 there are two screw-conveyors 40 and 41 (Figs. 7 and 8), the shafts 42 of which extend through apertures in the end walls of the bin and are journalled in bearing brackets 44 on the outer sides of the end walls. The shafts 42 are driven by means of a sprocket chain 46 which passes over sprockets on corresponding ends of the shafts and a driving sprocket 47 on the shaft of an electric motor 48.

The end of the pipe 6 through which the ground coffee is fed into the bin, is arranged adjacent the receiving end of the screw conveyor 40.

When the bin has been filled with a quantity of material, the top level of which reaches the screw conveyors 40 and 41, the screw conveyor 40 tends to feed the material longitudinally thereof away from the supply pipe 6. As the material reaches the opposite end of this conveyor, a deflecting plate 50 deflects the material towards the corresponding end of the screw conveyor 41. This conveyor tends to convey the material back to the opposite end thereof against a deflecting plate 52 which tends to deflect the material toward the receiving end of the screw conveyor 40. The screw conveyors are suitably spaced from the side walls of the bin and spaced from each other to cause them to prevent the material from piling up adjacent the lower end of the supply pipe 6 to level off the top of the material in the bin.

Adjacent the discharge end of the screw conveyor 41 is a gate 54 pivoted on a shaft 56. When the material in the bin reaches an excessively high level, the material is forced by the screw 41 against the gate 54 thus forcing the gate to swing outwardly. This movement of the gate acts through an arm 58 and suitable connections to operate a switch 59 to open the circuit connection with the electric motor of the air compressor 32, thus permitting the spring 36 to move the chamber 16 to shut off the feed of the beans to the grinder and hence the feed of the ground coffee into the bin. When the level of the coffee drops below the lower end of the gate 54, the switch 59 operates to close the circuit with the electric motor of the air compressor 32, thus causing thre damper 16 to be moved into open position to cause the flow of the coffee beans into the grinder to be resumed. Thus the ground coffee in the bin may be maintained at a substantially uniform level.

In the illustrated construction, means is provided for discharging measured quantities of coffee from the bottom of the bin through the opening 38. As shown, this means comprises a tubular sleeve 60 which is arranged adjacent the underside of the bin and is provided with a longitudinally extending slot 62 which registers with the opening 38 in the bottom of the bin. A corresponding slot 64 is provided in the underside of the sleeve 60.

A tubular sleeve 66 extends through the stationary sleeve 60 and is adapted to be rotated in one direction therein. This rotary or inner sleeve 66 is provided with a longitudinally extending slot 68 which during the rotation of the sleeve 66 in one direction is alternately brought into registry with the slots 62 and 64 in the outer sleeve 60.

In order to insure uniform flow of the material through the bottom of the bin, an inverted V-shaped baffle 61 is located in the center of the bin with its ends extending and secured to the end walls of the bin. The lower edges of the longitudinal sides of this baffle are spaced from the side walls of the bin. Beneath this baffle there is an agitator arranged in such a way that the material coming over the lower edges of the baffle are thoroughly mixed. This agitator consists of a shaft 63 and spokes 65 that are diametrically opposite each other.

With this construction, upon rotation of the inner sleeve 66 at a suitable speed, as the opening 68 registers with the opening 62 the ground coffee is adapted to flow by gravity from the bin into the sleeve 66 so as to fill the sleeve. As the slot 68 passes the slot 62 the latter is closed, and as the slot 68 passes over the slot 64 the contents of the inner sleeve discharges therefrom.

The ground coffee discharged from the sleeve 66 falls into a trough 70 in which there is mounted a screw-conveyor 72. This conveyor 72 rapidly feeds the material discharged into the trough into a chute or conduit 74 through which the material flows downwardly into the hopper of the can-filling machine (not shown).

Extending into the upper portion of the conduit 74 is a gate 76 having its upper end secured on a pivot rod 78. In case the can-filling machine stops or for other reasons the material in the conduit 74 fills the conduit and piles up adjacent the discharge end of the screw-conveyor 72, the material forces the gate outwardly whereupon it acts through suitable arm and lever connections 80 to operate a switch 81 to open a circuit connection with an electric motor 82 through which the inner sleeve 66 and the screw propeller 72 are driven, thus stopping the rotation of said sleeve and propeller 72 and hence the feed of the material from the bin. When the level of the material in the conduit drops sufficiently to permit the gate 76 to swing back to its initial position the motor circuit is again closed, thus causing the feed of the material from the bin and into the conduit 74 to be resumed.

The shaft 84 of the electric motor is connected by sprocket chain 86 with any suitable variable speed mechanism contained within a casing 88. This mechanism is connected through sprocket wheels and a chain 90 with a shaft 92 that carries the inner sleeve 66, and is connected through sprocket wheels and a chain 94 with a shaft 96 that carries the screw conveyor 72.

By means of the variable speed drive within the casing 88, the speed of operation of the discharging mechanism connected with the bin 8 may be varied as desired.

The openings or slots in the outer and inner sleeves 60 and 66 have webs 98 (Fig. 6) connecting their side walls, with the webs of the two sleeves set at opposite angles. As the inner sleeve 66 rotates, the angularly arranged webs of the two sleeves when they pass one another have a scissor-like action that serve to cause them to clear themselves of any material accumulating on the webs. The webs 98 prevent warping and lend additional strength to the equipment.

The sleeves 60 and 66 have a clearance between them of approximately .025 of an inch so as to allow for irregularities in machining. The granular material, such as ground coffee, is free to enter said clearance space between the sleeves so as to fill the space, and when this occurs the particles serve as a cushioning and centering means so that the inner sleeve always runs in a centered position and no lubricant is required. The two sleeves are made of dissimilar metal, so that in case of any metal to metal contact no abrasion or galling occurs.

As the inner sleeve 66 is rotated through one revolution, the coffee or other granular material drops into the tube and completely fills it when the opening or slot therein is in its upper position. After it reaches approximately 90 degrees, the slot is cut off, and when it rotates through 180 degrees the material in the sleeve is dumped downwardly upon the screw-conveyor 72 in the trough 70 which carries it to the chute 74 leading to the can-filling machine.

The screw-conveyor 72 is geared in such a way that for one revolution of the sleeve 66, all the material that is dumped upon the conveyor has been carried to the end of the screw and deposited in the chute 74. By means of the variable speed drive for the sleeve 66 and screw-conveyor 72 varied amounts can be drawn from the bin as desired.

It will be apparent with the construction above described that the length of time the particles of coffee take to pass through the bin 8 may be uniformly controlled so as to insure that all particles shall remain in the bin a sufficient time to permit the desired degasification thereof. Such control of the coffee passing through the bin is effected irrespective of variations in the speed of operation of the can-filling machine, or even complete stoppage of the machine. In case of stoppage of the machine, the filling of the chute 74 results in stoppage of the flow of coffee from the bin which in turn results in stoppage of the feeding of the coffee bins to the grinder. Thus the machine is capable of operating automatically to accomplish efficiently and accurately the desired result.

While the machine is particularly adapted for use in handling ground coffee as above described, it will be apparent that it may be used for handling other finely divided material where it is desired to effect a controllable and uniform feed of the material.

As will be evident to those skilled in the art, my invention permits various modifications without departing from the spirit thereof or the scope of the appended claims.

What I claim is:

In an apparatus of the class described, the combination of a bin, screw-conveyors located at the upper end portion of the bin arranged horizontally, and spaced from opposite walls of the bin and from each other, means for feeding finely divided material into the upper end of the bin, the material entering the bin adjacent the receiving end of one of said conveyors, and means for driving said conveyors whereby the material thus entering the bin tends to be fed longitudinally of the first-mentioned conveyor in one direction and then tends to be fed by the other conveyor in the opposite direction so as to tend to maintain the top of the material in the bin substantially level.

DOUGLAS M. McBEAN.